United States Patent Office 3,632,801
Patented Jan. 4, 1972

3,632,801
PHENYL-AZO-PHENYL COMPOUNDS
Wolfgang Groebke, Oberwil, Switzerland, assignor to Sandoz Ltd. (also known as Sandoz A.G., Basel, Switzerland
No Drawing. Filed Jan. 6, 1969, Ser. No. 789,388
Claims priority, application Switzerland, Feb. 2, 1968, 1,553/68
Int. Cl. C07c *107/06;* C09b *29/26*
U.S. Cl. 260—207    10 Claims

ABSTRACT OF THE DISCLOSURE 5-alkoxy-2-halo-4-nitrophenylazo - 2' - acylamino - 4'-(N,N-diacyloxyalkyl)aminobenzenes are of low solubility in water and are highly suitable for dyeing fibres and textiles consisting of hydrophobic synthetic or semi-synthetic organic compounds of high molecular weight.

The new compounds are of the formula

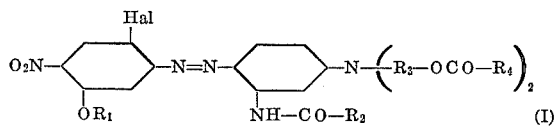
(I)

where:

Hal stands for a chlorine or bromine atom,
$R_1$ for a lower alkyl group,
$R_2$ for a lower alkyl or alkoxy radical which may be substituted by chlorine or bromine atoms or by a hydroxyl or cyano group, or for a phenyl radical,
$R_3$ for a lower alkylene radical, and
$R_4$ for a lower alkyl or alkoxy radical which may be substituted by chlorine or bromine atoms or by hydroxyl or cyano groups.

The radicals denoted "lower" in these definitions bear 1 to 4 or, more particularly, 1 or 2 carbon atoms.

The compounds of the Formula I are produced by diazotization of an amine of formula

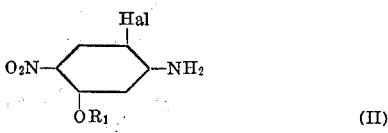
(II)

and coupling of the resulting diazonium compound with a compound of formula

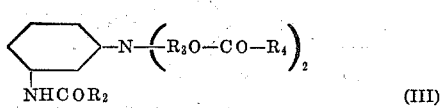
(III)

The coupling reaction generally takes place in acid medium and with cooling, preferably at 0–5° C.; the medium may, if necessary, be buffered to about pH 4, e.g. with an alkali acetate.

A further process for the production of the dyes of Formula I consists in esterifying a compound of the formula

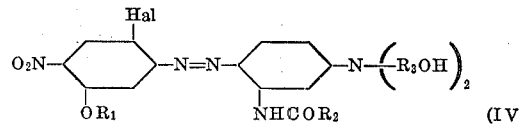
(IV)

with an acid of the formula $$R_4COOH \quad (V)$$

or a functional derivative of such an acid. Suitable functional acids are, e.g., the halides, in particular the bromides or chlorides, or the anhydrides.

It is desirable to convert the new dyes into dye preparations prior to application, employing for this purpose one of the normal methods, such as grinding in the presence of dispersing agents and/or fillers, with subsequent drying in a vacuum dried or atomizer. On the addition of a suitable amount of water the dyes can be applied to a substrate by an exhaustion dyeing, pad dyeing or printing process.

From aqueous dispersion the dyes build up well on fibres and textiles consisting of hydrophobic synthetic or semi-synthetic organic compounds of high molecular weight. They are especially suitable for the exhaustion dyeing, pad dyeing and printing of polyester, cellulose daicetate, cellulose triacetate and polyamide fibres. They are also dyeable on polyolefins, polyacrylonitrile and acrylonitrile copolymers, and polyvinyl compounds.

Known dyeing and priting methods are employed, for example that described in French Pat. 1,445,371.

The dyeings and prints obtained with these dyes have good all-round fastness, being particularly fast to thermofixation, sublimation, pleating, ozone and gas fumes. The wet fastness properties, including washing, water and sea water fastness, are very good. Other notable features are the good light and cross dyeing fastness and migration power. The dyes are stable to the different forms of permanent press finishing. They withstand boiling and reduction at temperatures up to about 220° C. and particularly up to 140° C., and show a wide range of acid and alkali stability. These stability properties are not adversely affected by the liquor ratio or by the presence of dyeing accelerants.

The parts given in Example 1 are by weight and the temperatures are in degrees centigrade.

EXAMPLE 1

At 70° 7 parts of sodium nitrite are added to 155 parts of sulphuric acid, and subsequently at 15–20° 100 parts of glacial acetic acid and 19.3 parts of 1-amino-2-chloro-4-nitro-5-methoxybenzene are added. After 2 hours the diazonium salt solution thus formed is run into a solution of 33.6 parts of N,N-bis-(acetoxyethyl)-amino-3-propionylanilide and 5 parts of aminosulphonic acid in 60 parts of glacial acetic acid and 100 parts of ice-water. The coupling reaction is brought to a close by the addition of a 20% sodium acetate solution causing a shift of the pH value to 4. The dye formed is filtered off with suction, washed free of acid and dried. It dyes polyester fibres in bright red shades which have very good fastness properties.

The table below specifies the substituents contained in further dyes of Formula I. These dyes can be produced in analogy with Example 1 and have fastness properties comparable to those of the dye there disclosed. On polyester fibres they give dyeings of red shade.

TABLE

| Example Number | Hal | R₁ | R₂ | R₃ | R₄ |
|---|---|---|---|---|---|
| 2 | Br | —CH₃ | —C₂H₅ | —CH₂CH₂— | —CH₃ |
| 3 | Br | —C₂H₅ | —C₂H₅ | Same as above | —CH₃ |
| 4 | Cl | —C₂H₅ | —C₂H₅ | do | —CH₃ |
| 5 | Cl | —CH₃ | —OC₂H₅ | do | —CH₃ |
| 6 | Cl | —C₂H₅ | Same as above | do | —CH₃ |
| 7 | Cl | —C₂H₅ | do | do | —CH₃ |
| 8 | Cl | —C₂H₅ | do | do | —C₂H₅ |
| 9 | Cl | —CH₃ | —OCH₃ | do | —C₂H₅ |
| 10 | Cl | —CH₃ | —OCH₃ | do | —C₂H₅ |
| 11 | Cl | —CH₃ | —C₂H₄Cl | do | —CH₃ |
| 12 | Cl | —CH₃ | Same as above | do | —C₂H₅ |
| 13 | Cl | —CH₃ | do | do | —C₂H₄Cl |
| 14 | Cl | —CH₃ | —C₂H₅ | do | —C₂H₄Cl |
| 15 | Cl | —CH₃ | —C₂H₅ | do | —C₂H₄CN |
| 16 | Cl | —CH₃ | —C₂H₅ | do | —CH₂CN |
| 17 | Cl | —CH₃ | —C₂H₅ | do | —C₂H₄OH |
| 18 | Cl | —CH₃ | —C₂H₄OH | do | —CH₃ |
| 19 | Cl | —CH₃ | —C₂H₄CN | do | —CH₃ |
| 20 | Cl | —CH₃ | Same as above | do | —CH₃ |
| 21 | Br | —CH₃ | do | do | —CH₃ |
| 22 | Br | —CH₃ | —C₂H₄Cl | do | —CH₃ |
| 23 | Br | —CH₃ | —CH₃ | do | —C₂H₄Cl |
| 24 | Cl | —C₂H₅ | —C₂H₄CN | do | —CH₃ |
| 25 | Cl | —C₂H₅ | —C₂H₅ | do | —C₂H₄Cl |
| 26 | Cl | CH₃ĊH—CH₃ | —CH₃ | do | —CH₃ |
| 27 | Cl | Same as above | —CH₂CH₂Cl | do | —CH₃ |
| 28 | Cl | CH₃ĊH—CH₂CH₃ | —CH₃ | do | —CH₃ |
| 29 | Cl | Same as above | —CH₃ | do | —C₂H₄CN |
| 30 | Cl | do | —CH₂CH₂Cl | do | —CH₃ |
| 31 | Br | —(CH₂)₃CH₃ | —CH₃ | do | —CH₃ |
| 32 | Br | —(CH₂)₂CH₃ | —CH₃ | do | —CH₃ |
| 33 | Cl | —CH₃ | —(CH₂)₂—CH₃ | do | —CH₃ |
| 34 | Cl | —CH₃ | —CH₃ | —(CH₂)₃— | —CH₃ |
| 35 | Cl | —CH₃ | —CH₃ | —CH₂—CH₂— | —OCH₃ |
| 36 | Cl | —C₂H₅ | —C₂H₅ | Same as above | —OCH₃ |
| 37 | Cl | —CH₃ | —C₂H₅ | do | —OC₂H₅ |
| 38 | Br | —CH₃ | —C₂H₅ | do | —OC₂H₅ |
| 39 | Cl | —CH₃ | —C₆H₅ | do | —CH₃ |
| 40 | Cl | —C₂H₅ | —C₆H₅ | do | —CH₃ |
| 41 | Cl | —CH₃ | —C₆H₅ | do | —OCH₃ |
| 42 | Br | —CH₃ | —C₆H₅ | do | —OCH₃ |
| 43 | Cl | —CH₃ | —CH₃ | do | —(CH₂)₂CH₃ |
| 44 | Br | —C₂H₅ | —CH₃ | do | Same as above. |
| 45 | Cl | —C₂H₅ | —CH₃ | do | Do. |

Representative dyestuffs of the foregoing examples are as follows:

Example 1
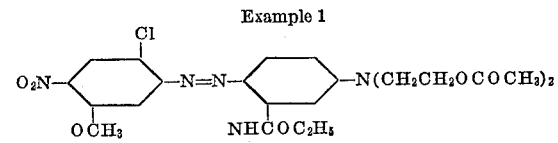

Example 2
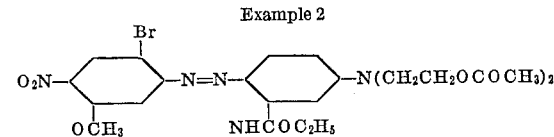

Example 3
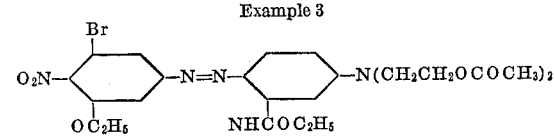

Example 12
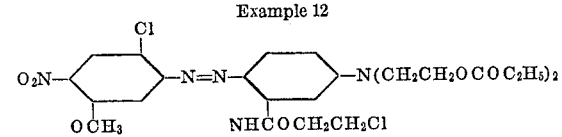

Example 14
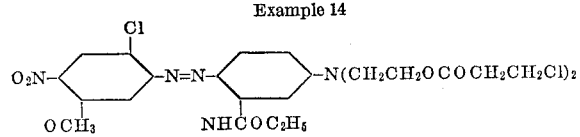

Example 26
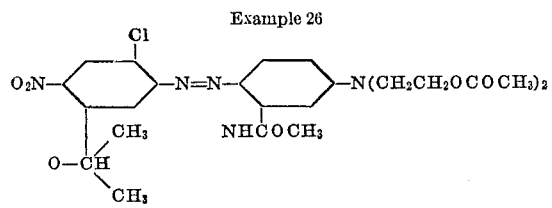

Example 36
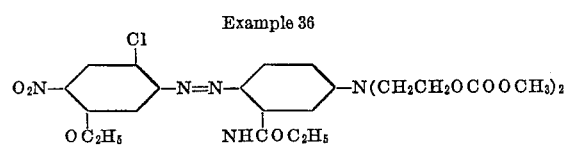

Example 40
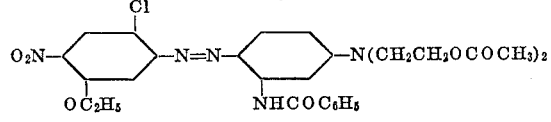

Example 45
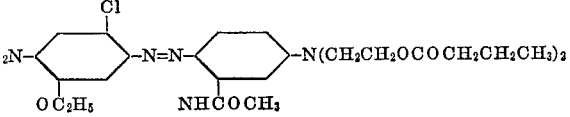

Having thus disclosed the invention what I claim is:
1. A monoazo compound of the formula

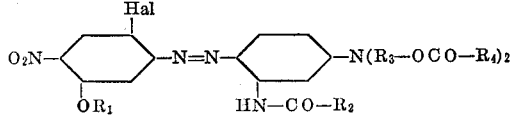

wherein

Hal is a member selected from the group consisting of chloro and bromo;

$R_1$ is lower alkyl;

$R_2$ is phenyl or a substituted or unsubstituted member selected from the group consisting of lower alkyl and lower alkoxy; any substituent of a substituted member being selected from the group consisting of chloro, bromo, hydroxy and cyano;

$R_3$ is lower alkylene; and $R_4$ is a substituted or unsubstituted member selected from the group consisting of lower alkyl and lower alkoxy; and substituent of a substituted member being selected from the group consisting of chloro, bromo, hydroxy and cyano.

2. The monoazo compound according to claim 1 of the formula

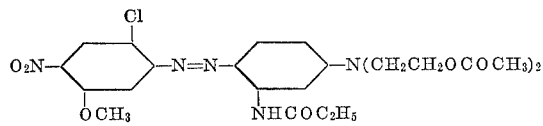

3. The monoazo compound according to claim 1 of the formula

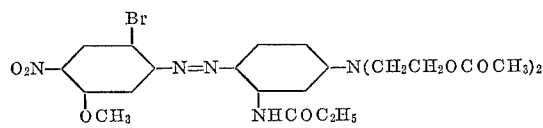

4. The monoazo compound according to claim 1 of the formula

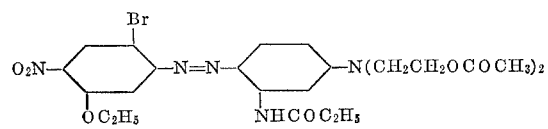

5. The monoazo compound according to claim 1 of the formula

6. The monoazo compound according to claim 1 of the formula

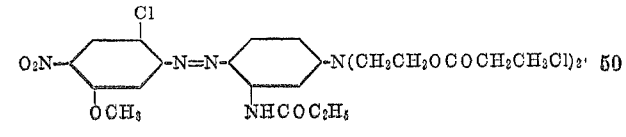

7. The monoazo compound according to claim 1 of the formula

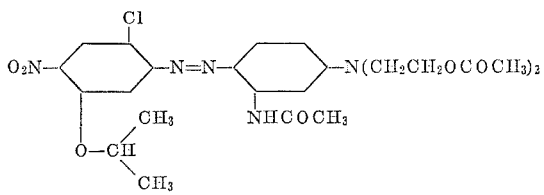

8. The monoazo compound according to claim 1 of the formula

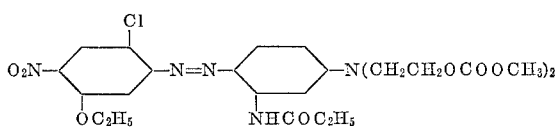

9. The monoazo compound according to claim 1 of the formula

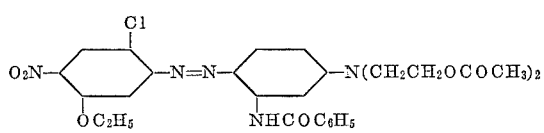

10. The monoazo compound according to claim 1 of the formula

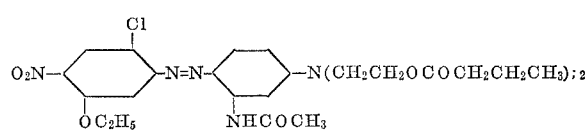

References Cited
FOREIGN PATENTS 1,514,544   1/1968   France _____ 260—207.1

CHARLES B. PARKER, Primary Examiner

C. F. WARREN, Assistant Examiner

U.S. Cl. X.R.

260—482 R, 575

PO-1050
(5/69)

UNITED STATES PATENT OFFICE
CERTIFICATE OF CORRECTION

Patent No. 3,632,801          Dated January 4, 1972

Inventor(s) WOLFGANG GROEBKE

It is certified that error appears in the above-identified patent and that said Letters Patent are hereby corrected as shown below:

Column 1, line 43, "of formula" should read --of the formula--; line 53, "of formula" should read --of the formula--; line 58, (after the formula) "(III)" should read --(III).--; line 64, "I" should read --(I)--. Column 2, line 5, (after the formula) "(IV" should read --(IV)--; line 26, "daicetate" should read --diacetate--; line 29, "priting" should read --printing--; line 63, "I." should read --(I).--. Column 3, line 48, (in the formula)

|                                                                     
"$OCH_3$" should read --$OCH_3$--; "$NHCOC_2H_5$" should read --$NHCOC_2H_5$--; line 55, (in the formula) "$OCH_3$" should read --$OCH_3$--; "$NHCOC_2H_5$" should read --$NHCOC_2H_5$--; line 58, (in the formula) " Br" should read --Br--;

line 62, (in the formula) "$OC_2H_5$" should read --$OC_2H_5$--; "$NHCOC_2H_5$" should read --$NHCOC_2H_5$--; line 69, (in the formula) "$OCH_3$" should read --$OCH_3$--;

$NHCOCH_2CH_2Cl$" should read --$NHCOCH_2CH_2Cl$--; line 75, (in the formula) "$OCH_3$"

should read --$OCH_3$--; "$NHCOC_2H_5$" should read --$NHCOC_2H_5$--. Column 4, line 47, "O-CH$\diagup^{CH_3}_{\diagdown CH_3}$" should read --O-CH$\diagup^{CH_3}_{\diagdown CH_3}$--; "$NHCOCH_3$" should read --$NHCOCH_3$--; line 54, (in the formula) "$OC_2H_5$" should read --$OC_2H_5$--; "$NHCOC_2H_5$" should read

PO-1050
(5/69)

UNITED STATES PATENT OFFICE
CERTIFICATE OF CORRECTION

Patent No. 3,632,801        Dated January 4, 1972

Inventor(s) WOLFGANG GROEBKE        - 2 -

It is certified that error appears in the above-identified patent and that said Letters Patent are hereby corrected as shown below:

$--\overset{|}{\text{NHCOC}_2\text{H}_5}--$; line 58 (in the formula) "$-\text{N}(\text{CH}_2\text{CH}_2\text{OCOCH}_2)_2$" should read $--\text{-N}(\text{CH}_2\text{CH}_2\overset{|}{\text{OCOCH}_3})_2--$; line 60, (in the formula) "$\text{OC}_2\text{H}_5$" should read $--\overset{|}{\text{OC}_2\text{H}_5}--$; line 67, (in the formula) "$\text{OC}_2\text{H}_5$" should read $--\overset{|}{\text{OC}_2\text{H}_5}--$; "$\text{NHCOCH}_3$" should read $--\overset{|}{\text{NHCOCH}_3}--$. Column 5, line 12, "and" should read --any--.

Signed and sealed this 13th day of March 1973.

(SEAL)
Attest:

EDWARD M. FLETCHER, JR.        ROBERT GOTTSCHALK
Attesting Officer        Commissioner of Patents